Feb. 13, 1940. W. I. STONE Re. 21,353

MACHINE FOR CUTTING SHEET MATERIAL

Original Filed June 14, 1937 2 Sheets-Sheet 1

Inventor
Walter I. Stone
By Attorney
Chas. T. Hawley

Feb. 13, 1940. W. I. STONE Re. 21,353
MACHINE FOR CUTTING SHEET MATERIAL
Original Filed June 14, 1937 2 Sheets-Sheet 2
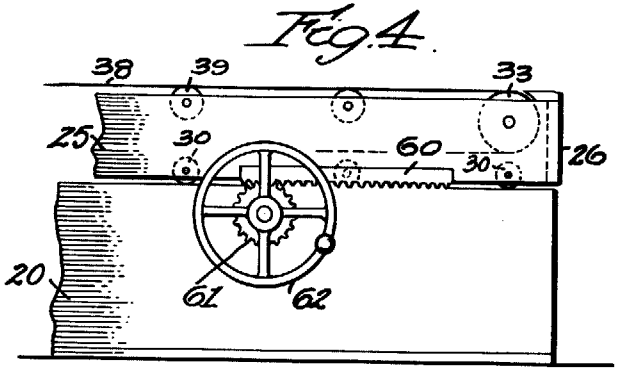
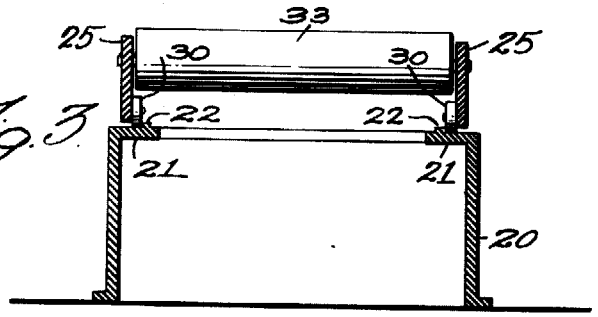
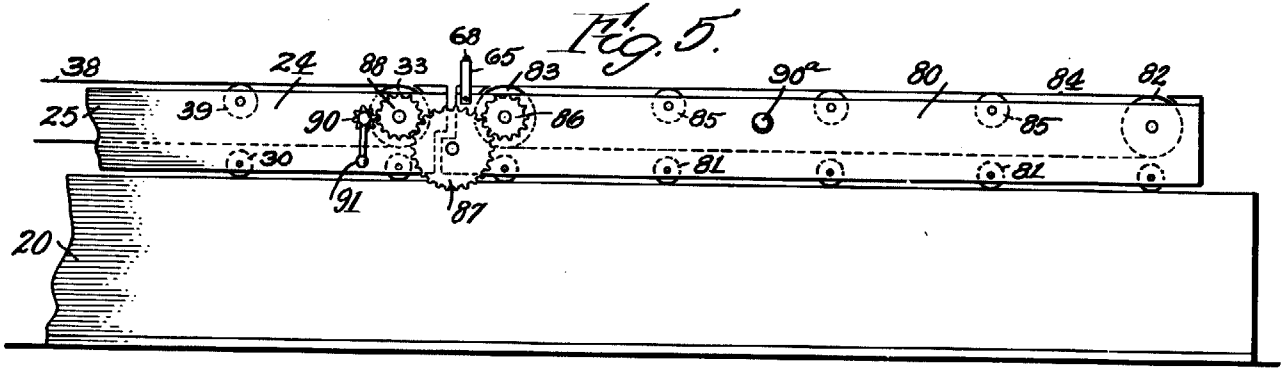
Inventor
Walter I. Stone
By Attorney
Chas. T. Hardley Reissued Feb. 13, 1940 Re. 21,353

UNITED STATES PATENT OFFICE 21,353

MACHINE FOR CUTTING SHEET MATERIAL

Walter I. Stone, Worcester, Mass., assignor of one-half to John J. Adams, Shrewsbury, Mass.

Original No. 2,131,153, dated September 27, 1938, Serial No. 148,160, June 14, 1937. Application for reissue October 30, 1939, Serial No. 301,998

20 Claims. (Cl. 164—58)

This invention relates to machines for cutting blanks from leather, cloth, Celluloid or other sheet material by forcing a knife-edge cutting die therethrough. Such cutting dies are of substantial size and weight.

It has been found desirable to move the die and cutting block forward from beneath the die head for convenient inspection of the work and for relocation of the die after each cutting operation. Provision for such forward movement has been made in cutting machines heretofore built and these machines have been found satisfactory in operation so long as the piece of stock to be cut was not of substantially greater size than the upper surface of the cutting block.

It is often desired, however, to cut blanks from strips of material of substantial length and also to cut blanks from a considerable number of superimposed long strips at a single cutting operation. Such long or superimposed strips could not be readily shifted forward in said prior machines for inspection of the work or relocation of the cutting die thereon.

It is the general object of my invention to provide a cutting machine having provision for supporting long or superimposed strips of sheet material during a cutting operation and also for supporting such material as it is moved forward and rearward in the machine with the cutting block.

Another object of my invention is to provide means for moving the sheet material relative to the cutting block, in addition to the above movement of the material in unison with said block.

I also provide manually controlled power means by which a cutting block, together with its superposed stock and cutting die, may be automatically actuated in a predetermined complete cycle comprising a rearward movement thereof from forward position to cutting position, a dwell during the cutting operation, a return movement to initial forward position, and the stopping of the block in such forward position.

My invention further relates to arrangements and combinations of parts which will be hereinafter described and more particularly pointed out in the appended claims.

A preferred form of the invention is shown in the drawings, in which:

Fig. 3 is a transverse sectional elevation, taken along the line 3—3 of Fig. 1;

Fig. 4 is a partial side elevation showing a modified construction; and

Fig. 5 is a partial side elevation showing a further modification.

Figures 1, 2:
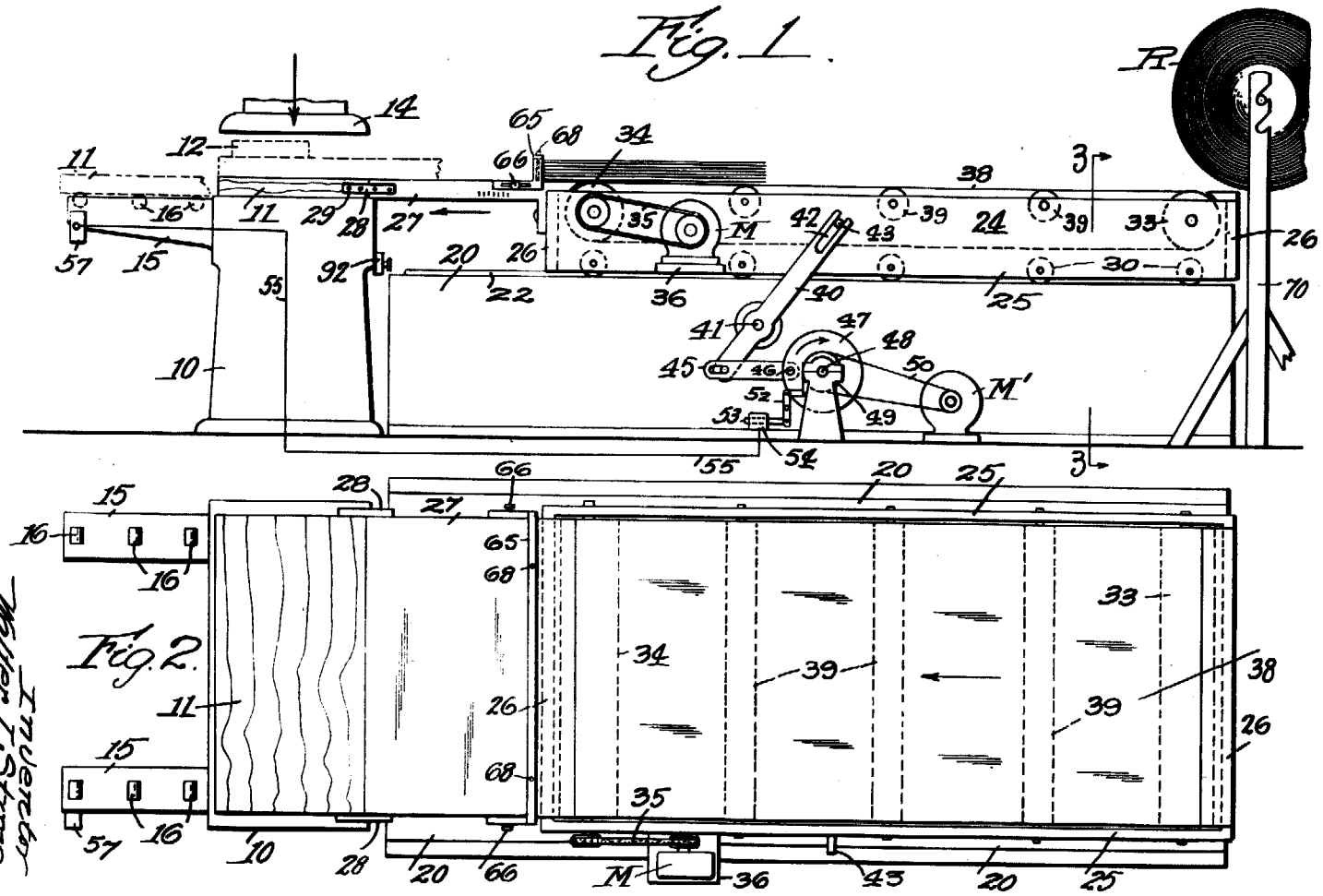
Fig. 1 is a partial side elevation of a cutting machine embodying my improvements.
Fig. 2 is a plan view thereof, with certain driving mechanism omitted.

Referring to Figs. 1 and 2 I have shown portions of a cutting-machine including a base 10, a cutting block 11, a cutting die 12 and a cutting head 14. The base 10 is provided with offset brackets 15, preferably each having a plurality of rolls 16 mounted thereon. The brackets 15 and rolls 16 serve to support the cutting block 11 when the block is moved forward from beneath the cutting head 14.

In the carrying out of my invention, I provide an auxiliary base 20 (Fig. 3) having supporting flanges 21 and guide strips 22. A carriage 24 is mounted on the auxiliary base 20 and is shown herein as comprising a rectangular frame having sides 25 and ends 26. A bracket 27 (Fig. 1) is secured to one of the ends 26 and projects forward in horizontal alignment with the cutting block 11, to which it may be secured in any convenient manner, as by straps 28 (Fig. 1) and screws or other fastening devices 29. The cutting block 11 is commonly of wood.

Rolls 30 (Figs. 1 and 3) are mounted along the lower edges of the sides 25 of the carriage 24 and are supported on the flanges 21 and guided by the strips 22.

Rollers 33 and 34 are mounted at the ends of the carriage 24 and the roller 34 is connected by a belt 35 to a driving motor M. The motor M is supported on a bracket 36 projecting laterally from one of the side members 25 of the carriage 24. A conveyor belt 38 is mounted on the rollers 33 and 34, and the upper run of the belt is supported on intermediate rollers 39.

With this construction, extended strips of sheet material, either single or superposed, may be supported on the conveyor belt 38, the bracket 27 and the cutting block 11, and this entire structure may be moved forward and rearward in the cutting machine on the rolls 30 and 16 previously described.

Means is preferably provided for moving the carriage 24 by power, and illustrative mechanism for this purpose is indicated in Fig. 1. A lever 40 is pivoted at 41 on the auxiliary base 20 and is provided with a slot 42 to receive a stud 43 in the side of the carriage 24. The lower end of the lever 40 has a stud-and-slot connection to a link 45, which in turn is pivoted on a crankpin 46 in a disc 47 mounted at one end of a crankshaft 48.

A pulley 49 is loose on the crankshaft 48 and is connected by a belt 50 to a driving motor M'. A one-revolution clutch of commercial design is preferably provided between the pulley 49 and the crankshaft 48, and this clutch may be controlled by a lever 52 connected to a plunger 53 slidable in a solenoid coil 54.

The coil 54 is preferably connected by a wire 55 to a push-button 57 mounted on one of the brackets 15. When the button 57 is pushed, the solenoid coil 54 is energized, actuating the plunger 53 and thereby moving the lever 52 to release the clutch and to effect a single revolution of the crankshaft 48.

The parts are so arranged that the cutting block 11 will come to rest in its normal forward position, as indicated in dotted lines in Fig. 1. When the clutch is released, the parts will move rearward to the position shown in full lines in Fig. 1, at which point the slotted connection between the link 45 and lever 40 will cause a substantial dwell, during which the cutting head 14 descends and forces the die 12 through the stock. As the cutting head then rises, the carriage 24 and cutting block 11 move forward or to the left in Fig. 1, thus advancing the cutting block 11 and die 12 to convenient position for inspection of work or relocation of the die.

In the alternative arrangement shown in Fig. 4, the power mechanism for moving the carriage is omitted and a rack 60, pinion 61 and hand wheel 62 are substituted, by which the carriage may be moved forward and rearward manually.

It is often desired to assemble a large number of superposed strips of material on the carriage 24, and for such purposes I provide a gauge-bar 65 (Figs. 1 and 2) adjustably secured to the edges of the bracket 27 by screws 66. The gauge-bar 65 extends across the bracket 27 but in vertically spaced relation thereto, and is provided with gauge-pins 68 which may be inserted to form stops when assembling the material. After the required number of strips have been assembled, the pins 68 are withdrawn so that the conveyor belt 38 may operate to advance the assembled strips to cutting position.

For convenience in assembling the strips, I preferably provide a stand 70 on which a roll R of sheet material may be supported.

It is also at times desirable to have an auxiliary carriage on which strips of stock may be assembled, while the machine is operating on stock previously assembled. For this purpose I may provide the auxiliary carriage 80 shown in Fig. 5, supported on rolls 81 and provided with rollers 82 and 83, a conveyor belt 84 and intermediate rollers 85, all as previously described. The roll 83 may have a pinion 86 meshing with an intermediate gear 87 mounted on the carriage 80 and positioned to engage a pinion 88 on the roller 33 previously described. A handle 90[a] on the side of the carriage 80 provides means by which the carriage may be advanced manually to cause the gear 87 and pinion 88 to mesh, whereupon the motor M may be operated to move the belts 38 and 84 simultaneously and to advance the assembled stock from the auxiliary carriage 80 to the regular carriage 24.

A safety switch 92 (Fig. 1) may be provided, which will be engaged by the end 26 of the carriage 24 when the carriage reaches its extreme forward or left-hand position, as viewed in Fig. 1. Such engagement breaks the operating circuit of the cutting head 14, so that the head cannot descend until the stock-supporting parts and cutting block move rearward.

With the construction described, pieces of stock of any reasonable length and in very considerable numbers may be conveniently operated on by cutting dies and may be advanced and withdrawn in the machine, either manually or automatically. Furthermore, the assembled strips of stock may be collectively advanced relative to the cutting block 11, when cutting operations upon a given portion of stock have been completed. If desired, a pinion 90 (Fig. 5) and handle 91 may be provided for moving the conveyor belt 38 manually. The pinion 90 may mesh with the gear 88 previously described.

Having thus described my invention and the advantages thereof, I do not wish to be limited to the details herein disclosed, otherwise than as set forth in the claims, but what I claim is:

1. In a machine for cutting sheet material having a base, a cutting block and a cutting head, that improvement which consists in providing an auxiliary support for long strips of sheet material which support extends substantially rearward from said cutting block, means to connect said support to move with said block, a bearing member on which said support is slidably mounted, and means to move said block and support simultaneously forward and rearward on said base and bearing member.

2. In a machine for cutting sheet material having a base, a cutting block and a cutting head, that improvement which consists in providing an auxiliary support for long strips of sheet material which support extends substantially rearward from said cutting block, means to connect said support to move with said block, a bearing member on which said support is slidably mounted, and automatic means to move said block and support simultaneously rearward and thereafter forward in a continuous cycle and to automatically stop said parts in extreme forward position.

3. In a machine for cutting sheet material having a base, a cutting block and a cutting head, that improvement which consists in providing a carriage to support said sheet material, means to support and guide said carriage, means to connect said carriage to said cutting block, and means to move said carriage and block and the sheet material supported thereon as a unit relative to said cutting head.

4. In a machine for cutting sheet material having a base, a cutting block and a cutting head, that improvement which consists in providing a carriage to support said sheet material, means to support and guide said carriage, means to connect said carriage to said cutting block, and automatic means to give said carriage and cutting block and the sheet material thereon a single complete rearward and forward reciprocation as a unit relative to said cutting head.

5. In a machine for cutting sheet material having a base, a cutting block and a cutting head, that improvement which consists in providing a carriage to support said sheet material, means to support and guide said carriage, means to connect said carriage to said cutting block, and automatic means to give said carriage and cutting block and the sheet material thereon a single complete rearward and forward reciprocation as a unit relative to said cutting head and to bring said parts to rest in forward position.

6. In a machine for cutting sheet material having a base, a cutting block and a cutting head, that improvement which consists in providing a carriage to support said sheet material, means to support and guide said carriage, means to connect said carriage to said cutting block, and automatic means to give said carriage and cutting block and the sheet material thereon a single complete rearward and forward reciprocation as a unit relative to said cutting head, said automatic means being effective to bring said parts to rest in forward position and to provide a dwell when said parts are in rearward position.

7. In a machine for cutting sheet material having a base, a cutting block and a cutting head, that improvement which consists in providing a carriage to support said sheet material, means to support and guide said carriage, means to connect said carriage to said cutting block, automatic means to give said carriage and cutting block and the sheet material thereon a single complete rearward and forward reciprocation as a unit relative to said cutting head and to bring said parts to rest in forward position, and said automatic means including a lost-motion device which provides a dwell between the rearward and forward movements of said parts.

8. In a machine for cutting sheet material having a base, a cutting block and a cutting head, that improvement which consists in providing mechanical means to alternately advance and withdraw the cutting block and sheet material relative to said cutting head, and additional means to advance said sheet material relative to said cutting block.

9. In a machine for cutting sheet material having a base, a cutting block and a cutting head, that improvement which consists in providing a support for the sheet material which extends substantially rearward from said cutting block, automatic means to move said block and support simultaneously forward and rearward and to stop said parts in extreme forward position, and means to prevent operation of said cutting head when said parts are in extreme forward position.

10. In a machine for cutting sheet material having a base, a cutting block, a cutting head and an offset support for said cutting block when in forward position, that improvement which consists in providing means to support substantially elongated sheet material, means to move said sheet material forward along said support relative to the cutting block, and means to move said supported sheet material and cutting block forward as a unit relative to said cutting head, thereby advancing said cutting block over said offset support.

11. In a machine for cutting sheet material having a base, a cutting block, a cutting head and an offset support for said cutting block when in forward position, that improvement which consists in providing a carriage to support said sheet material, a supporting member projecting forward from said carriage, means to connect said member to said cutting block, and means to move said block forward over said offset support and to simultaneously move said supporting member forward over said machine base.

12. In a machine for cutting sheet material having a base, a cutting block and a cutting head, that improvement which consists in providing a carriage to support said sheet material, means to move said sheet material forward along said carriage and relative to the cutting block, automatic means to move said carriage and cutting block forward as a unit relative to said cutting head and to stop said parts in forward position, and means to prevent operation of said cutting head when said parts are in forward position.

13. In a machine for cutting sheet material having a base, a cutting block and a cutting head, that improvement which consists in providing a carriage to support said sheet material, power means mounted on said carriage and movable therewith, said power means being effective to move said sheet material forward along said carriage and relative to the cutting block, and means to move said carriage and cutting block forward as a unit relative to said cutting head.

14. In a machine for cutting sheet material having a base, a cutting block and a cutting head, that improvement which consists in providing a carriage to support said sheet material, means to support and guide said carriage, means to connect said carriage to said cutting block, means to move said carriage and block and the sheet material supported thereon as a unit relative to said cutting head, a conveyor on said carriage, and means to actuate said conveyor to advance the sheet material along said carriage and relative to said cutting block.

15. The combination in a machine for cutting sheet material as set forth in claim 14, in which is provided an auxiliary carriage, a second conveyor, and means to drive said second conveyor from said first conveyor when said carriages are positioned closely adjacent each other.

16. The combination in a machine for cutting sheet material as set forth in claim 14, in which is provided a gauge device for said sheet material having the gauging elements thereof removable to permit passage of said sheet material through said device during operation of said machine.

17. In a machine for cutting sheet material having a base, a cutting block and a cutting head, that improvement which consists in providing a support for said sheet material, a conveyor on said support, means to move said conveyor to advance the sheet material along said support and relative to the cutting block, and means to move said support and said cutting block simultaneously to advance and withdraw the sheet material and cutting block relative to the cutting head.

18. In a machine for cutting sheet material having a base, a cutting block and a cutting head, that improvement which consists in providing power mechanism mechanically effective to give said cutting block and the sheet material thereon a single complete rearward and forward reciprocation as a unit relative to said cutting head and to bring said parts to rest in initial forward position and including means to provide a dwell of said cutting block between the rearward and forward movements of said block for operation of said cutting head, said rearward movement, dwell, forward movement and bringing-to-rest constituting a mechanically predetermined and complete cycle of operation for said cutting block, and manually controlled means to initiate said predetermined cycle of operation.

19. In a machine for cutting sheet material, the combination with a cutting block and a power operated cutting head reciprocable toward and from the cutting block, of power and control means for operating the cutting block through a mechanically predetermined complete cycle in which the cutting block is caused to move in one direction to carry a predetermined portion of the sheet material beneath the cutting head for a cutting operation, then to remain stationary while the cutting operation is performed and finally to return to initial position and come to rest, and manual means to cause said complete cycle to be initiated while the cutting head is in withdrawn position.

20. In a machine for cutting sheet material, the combination with a cutting block and a power operated cutting head reciprocable toward and from the cutting block, of a carriage for operating the cutting block, power and control means for operating the carriage through a mechanically predetermined complete cycle in which the cutting block is caused to move in one direction to carry a predetermined portion of the sheet material beneath the cutting head for a cutting operation, then to remain stationary while the cutting operation is performed and finally to return to initial position and come to rest, and manual means to cause said complete cycle to be initiated while the cutting head is in withdrawn position.

WALTER I. STONE.